T. A. WESTON.
FRICTION CLUTCH.
APPLICATION FILED OCT. 24, 1907.

953,652.

Patented Mar. 29, 1910.

2 SHEETS—SHEET 1.

WITNESSES
William Abbe
L. H. Grote

INVENTOR
Thomas A. Weston
by Howson and Howson
Attys.

T. A. WESTON.
FRICTION CLUTCH.
APPLICATION FILED OCT. 24, 1907.
953,652.
Patented Mar. 29, 1910.
2 SHEETS—SHEET 2.
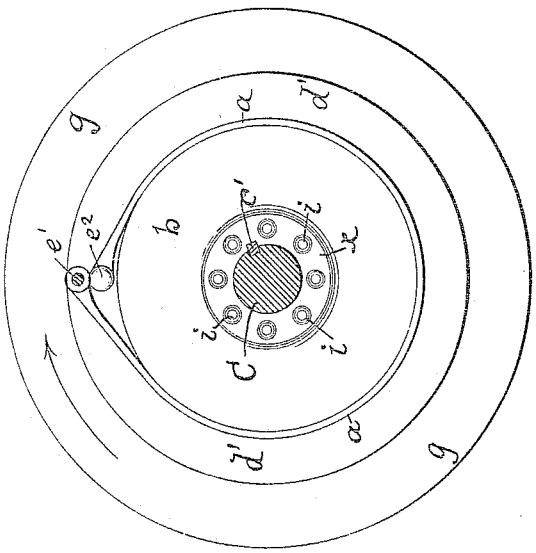
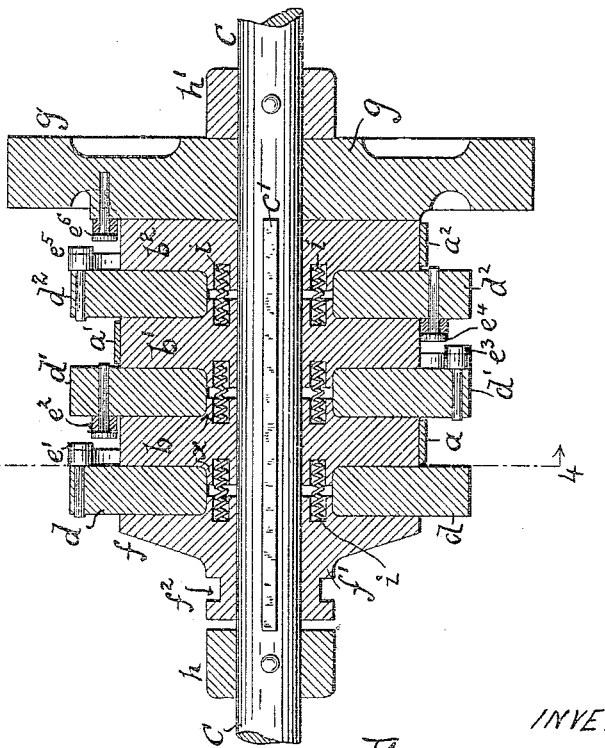
WITNESSES
William Abk
L. H. Grote
INVENTOR
Thomas A. Weston
by Howson and Howson
attys.

UNITED STATES PATENT OFFICE.

THOMAS A. WESTON, OF ARDEN, NORTH CAROLINA.

FRICTION-CLUTCH.

953,652.

Specification of Letters Patent. Patented Mar. 29, 1910.

Application filed October 24, 1907. Serial No. 398,880.

*To all whom it may concern:*

Be it known that I, THOMAS A. WESTON, a citizen of the United States of America, residing in Arden, in the county of Buncombe, in the State of North Carolina, have invented a certain new and Improved Friction-Clutch, of which the following is a specification.

My invention consists of an improved friction clutch or brake, embodying the features, first, of a series of parallel friction straps, and a corresponding series of brake pulleys, each friction strap coacting with its own brake pulley; and secondly, of combining with the foregoing multiple strap feature, any multiple friction disk device such as that of my former patent No. 75,227, of March 3rd, 1868.

Figure 3:
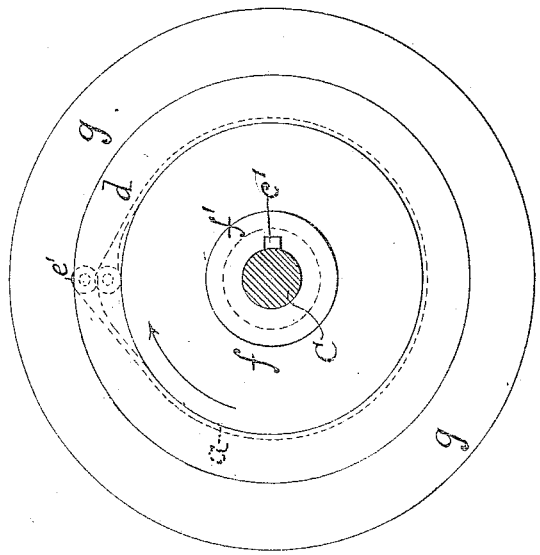
Figure 1:
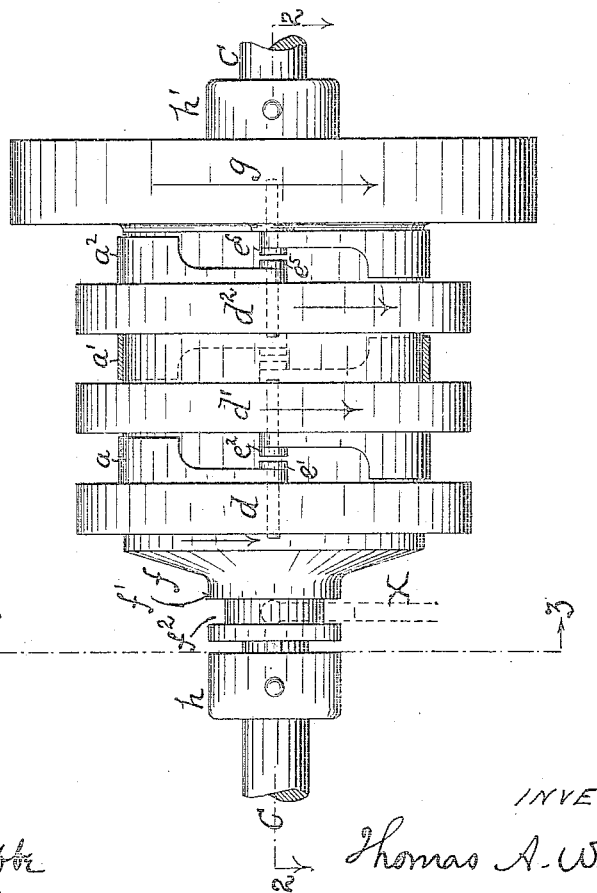

In the accompanying drawings Figure 1 is a side elevation partly sectional; Fig. 2 is a horizontal transverse section on the line 2—2, Fig. 1; Fig. 3 is a section on the line 3—3, Fig. 1; and Fig. 4 is a section on the line 4—4, Fig. 2.

$a$, $a^1$, $a^2$ are the multiple straps for contacting with the rims of their respective pulleys $b$, $b^1$, $b^2$, the latter fixed to the shaft C by the key $c^1$, but so as to be free to move longitudinally upon the shaft C to a limited extent.

$d$, $d^1$, $d^2$, are the strap connecting devices or crank disks carrying the crank pins or studs $e^1$, $e^2$, $e^3$, $e^4$, $e^5$, $e^6$, placed diametrically opposite each other and on opposite sides of the said disks. The said disks turn freely upon the central bosses $x$ of the pulleys $b$, $b^1$, $b^2$, and the boss $f^1$ of the pressing disk $f$. Free upon the shaft C is a driving or driven band wheel $g$ capable of driving the shaft C or of being driven by it through the friction devices. I secure to the shaft C collars $h$, $h^1$, which confine the foregoing parts longitudinally on the said shaft. Spiral springs $i$, $i$, are employed to separate or free from each other sidewise the pulleys $b$ and disks $d$ in case that side contact and friction between the said parts $b$ and $d$ be desired in order thus to supplement the multiple strap friction with the disk friction action.

The strap $a$ begins at and upon the crank stud $e^1$ on the disk $d$ and extends around the pulley $b$ to the stud $e^2$ on the disk $d^1$. The strap $a^1$ in like manner connects the disks $d^1$ and $d^2$. The strap $a^2$ connects the disk $d^2$ to the wheel $g$. More straps and pulleys can be added in like manner as desired.

When the multiple strap friction alone is employed the pulleys $b$, $b^1$, $b^2$ are immovably keyed to the shaft C, the springs $i$ being omitted, and the operation in that case is as follows:—The pressing disk $f$, by means of a common forked lever X, engaged with the groove $f^2$, can press its disk face against the opposed or first loose crank disk $d$, imparting thereto by its friction a proportionate rotatory impulse from the shaft C in the direction of the arrows; the straps then successively tighten around their respective pulleys $b$, $b^1$, $b^2$, accumulating friction therefrom throughout the series, and delivering the ultimate pull or stress thereof upon the wheel $g$ to drive it in the direction of the arrows to the right or to drive the shaft from the band wheel in a contrary direction.

The contacting friction surfaces of the pulleys and straps, also of the disk sides, can be metal to metal, metal to wood, metal to leather, or of any other suitable materials used in like situations for brake duty in accordance with methods familiar to machinists.

In order to augment the friction of the multiple straps by the disk friction of the crank disks and pulley sides, the pulleys $b$, $b^1$, $b^2$ are fitted to the shaft C and key or feather $c^1$ so as to slide freely thereon, longitudinally of the shaft, and springs $i$ in the boss of the pressure disk $f$ and in the bosses of the pulleys $b$, $b^1$, $b^2$, serve to push the said parts free of each other when the coupling pressure of the disk $f$ is withdrawn. The said parts $f$, $b$, $b^1$, $b^2$, and $d$, $d^1$, $d^2$ are shown in Fig. 2 as compressed together against the band wheel $g$ and fixed collar $h^1$, leaving a small vacant space between the collar $h$ and the pressing disk $f$. When the pressing disk $f$ is backed away from the disks and pulleys and is hard up against the collar $h$, the said vacant space is evenly divided between the sliding parts, the springs being of proper length and strength to effect such uniform spacing apart so that the series of connected straps $a$, $a^1$, $a^2$, disks $d$ and band wheel $g$ may be at rest, while the shaft C and pulleys $b$, $b^1$, $b^2$ revolve or vice versa.

Although in the foregoing description of the construction and operation of my improved appliance, I have spoken of it as a clutch for coupling or uncoupling driving and driven parts, it will be understood that my invention is equally efficient as a friction brake, without material change in construction. Thus my invention as a brake only for retarding rotation of the shaft C is illustrated by regarding the wheel $g$ as a fixture, or a stationary abutment, made so in any convenient manner, in which case the mode of operation involving the same parts as hereinbefore described will obtain with the one object of simply retarding or arresting entirely the rotation of the shaft C. Therefore in the following claims I use the term "friction clutch" in a sufficiently broad sense to include a device for retarding rotation by friction as well as a device for coupling by friction.

I claim as my invention—

1. A sectional coil friction clutch having a series of substantially whole-circle separate brake straps, an abutment member intervening between adjacent straps and means for connecting the ends of adjacent straps thereto at points diametrically opposite.

2. A sectional coil-friction clutch having separate strap sections and disks rotatory on the clutch axis, supporting and connecting the diametrically opposed ends of the strap sections.

3. A sectional coil-friction clutch having separate strap sections, rings or disks rotatory on the clutch axis and provided with studs or crank-pins whereon the ends of adjacent strap sections pivot, diametrically opposite each other.

4. A sectional coil-friction clutch having separate strap sections, rotatory disk or rings provided with studs or crank pins whereon the ends of adjacent strap sections pivot, the said studs or pins being diametrically opposite to each other and pointing in opposite directions.

5. The combination with a sectional coil-friction clutch of multiple friction disks said disks being also the connecting means between the coil sections.

6. A friction clutch consisting of a series of strap brake pulleys, a series of brake straps, one to each pulley with rotatory means for connecting the said straps, such rotation being on the clutch axis.

7. A friction clutch consisting of a series of brake pulleys, a series of coacting brake straps, one to each pulley, a series of friction disks serving also as connecting means between the ends of adjacent straps, whereby coil friction is obtained upon the said pulleys, and disk friction between said pulleys and said friction disks.

8. A friction clutch consisting of a shaft, a series of strap brake pulleys capable of sliding along the shaft, a series of brake straps, one strap to each pulley, a series of strap-carrying disks connecting adjacent straps, the said disks and pulleys being capable of side friction upon each other.

In testimony whereof I have signed my name to this specification, in the presence of two subscribing witnesses.

THOMAS A. WESTON.

Witnesses:
WILLIAM ABBE,
L. H. GROTE.